United States Patent
Miller et al.

(10) Patent No.: US 10,220,818 B1
(45) Date of Patent: Mar. 5, 2019

(54) VEHICLE DECELERATION DEVICE AND METHOD

(71) Applicants: Benjamin Miller, Indianapolis, IN (US); Akira Samuel Nakaza, Indianapolis, IN (US); Kar Hoe Leong, Indianapolis, IN (US)

(72) Inventors: Benjamin Miller, Indianapolis, IN (US); Akira Samuel Nakaza, Indianapolis, IN (US); Kar Hoe Leong, Indianapolis, IN (US)

( * ) Notice: Subject to any disclaimer, the term of this patent is extended or adjusted under 35 U.S.C. 154(b) by 0 days.

(21) Appl. No.: 15/826,256

(22) Filed: Nov. 29, 2017

(51) Int. Cl.
  *B60T 1/14* (2006.01)
  *B60T 8/32* (2006.01)
  *B60T 7/22* (2006.01)
  *B60T 8/171* (2006.01)

(52) U.S. Cl.
  CPC .................. *B60T 1/14* (2013.01); *B60T 7/22* (2013.01); *B60T 8/171* (2013.01); *B60T 8/32* (2013.01); *B60T 2210/30* (2013.01)

(58) Field of Classification Search
  CPC ... B60T 1/14; B60T 7/22; B60T 8/171; B60T 8/32

USPC .......................................................... 701/70
See application file for complete search history.

(56) References Cited

U.S. PATENT DOCUMENTS

| | | | |
|---|---|---|---|
| 3,923,117 A | 12/1975 | Valdez | |
| 2011/0082606 A1* | 4/2011 | Kumar | B61C 15/04 701/19 |
| 2014/0277883 A1* | 9/2014 | Pulliam | B60L 15/20 701/22 |
| 2014/0343811 A1* | 11/2014 | Ringwald | B60K 31/00 701/60 |

* cited by examiner

*Primary Examiner* — Tan Q Nguyen

(57) ABSTRACT

A vehicle deceleration system for stopping a vehicle that includes of a set of sensors, a controller, force applicators, and a friction applicator. The first sensor reads the ambient air temperature, the second sensor reads the vehicle speed, and a third sensor indicates if antilock brake system is operational. The controller calculates the distance between the front bumper and any surrounding objects to adjust the stopping force accordingly. The controller monitors the three sensors and a processor checks for predetermined given conditions. If all checks are met, the controller activates the force applicators. When the force applicators extend, they rotate a friction applicator into the road surface until the vehicle comes to a complete stop.

5 Claims, 4 Drawing Sheets

VEHICLE DECELERATION DEVICE AND METHOD

TECHNICAL FIELD

The present application relates to an emergency braking system, and more particularly to the ability to stop a vehicle sliding on slick roads.

BACKGROUND

This section introduces aspects that may help facilitate a better understanding of the disclosure. Accordingly, these statements are to be read in this light and are not to be understood as admissions about what is or is not prior art.

Current antilock brake systems (ABS) are capable of decelerating vehicles in certain situations but there are occurrences where the system can still leave a driver sliding on slick or icy road conditions. When sliding on, e.g., an icy road, the driver is in a helpless situation, as the ABS is unable to stop the vehicle while it is pulsating the braking system, however, the vehicle continues to move even at ultra-low speeds until the vehicle comes to a stop in an undesirable fashion, e.g., by colliding with another vehicle or an object, resulting in damage to the vehicle. When ABS is on, the driver loses their ability to regulate their brake pressure as the brakes are controlled by the ABS (typically by pulsating the brakes). While sliding the driver has no ability to prevent their vehicle from colliding with other vehicles or stationary objects in front of them.

In certain situations, use of studded tires can provide the needed deceleration, however, such tires are outlawed in several states as they cause significant damage to roads when they are not needed.

In certain other situations, tires can be outfitted with chains, however, chains are difficult to install, they require pre-planning, and they damage roads as well as the tires.

There is, therefore an unmet need for a novel arrangement and method of use for decelerating a motor vehicle on slick driving surfaces when an unexpected loss of traction occurs that will not damage roads comparatively to prior art arrangements that may or may not be illegal for use on various roads or the motor vehicle.

SUMMARY

A vehicle deceleration system for stopping a vehicle that includes of a set of sensors, a controller, force applicators, and a friction applicator. The first sensor reads the ambient air temperature, the second sensor reads the vehicle speed, and a third sensor indicates if antilock brake system is operational. The controller calculates the distance between the front bumper and any surrounding objects to adjust the stopping force accordingly. The controller monitors the three sensors and a processor checks for predetermined given conditions. If all checks are met, the controller activates the force applicators. When the force applicators extend, they rotate a friction applicator into the road surface until the vehicle comes to a complete stop.

DETAILED DESCRIPTION

Figure 1A:
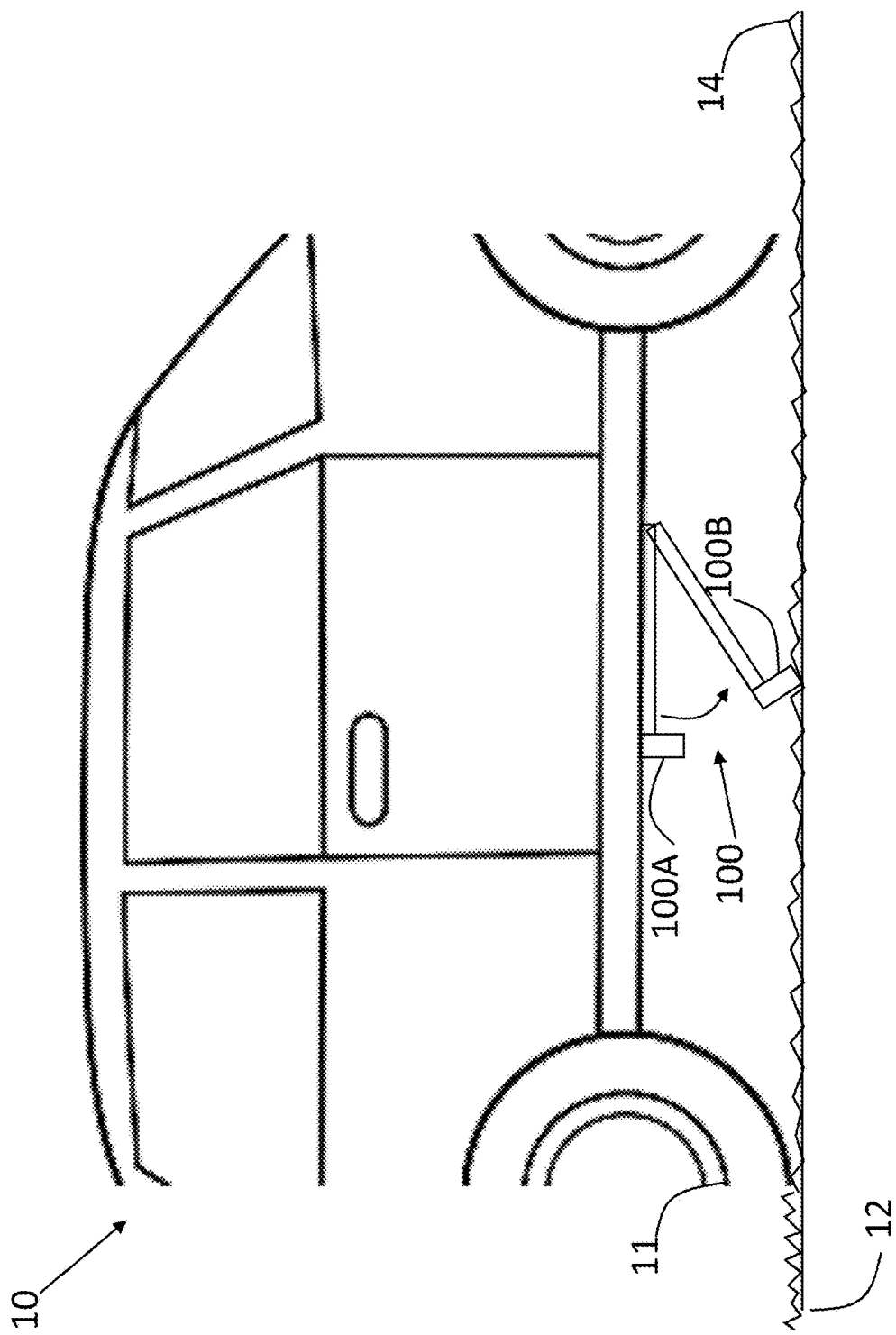
FIG. 1A is a schematic of a motor vehicle shown on a slick road utilizing a deceleration system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The present disclosure provides a novel arrangement and method of use of the arrangement for decelerating a motor vehicle on slick driving surfaces when an unexpected loss of traction occurs that will not damage roads comparatively to prior art arrangements that may or may not be illegal for use on various roads or the motor vehicle. The novel arrangement includes an automated or a manual deployment of a traction enhancement system that when deployed makes frictional interface with the road surface in order to slow or stop the vehicle.

FIG. 1A is a schematic of a motor vehicle 10 operating on a slick road. The slick road includes a road surface 12, and a layer of material 14 that causes the road 12 to become slick. The material 14 can be ice, oil, sand, snow, or any other material that can reduce the coefficient of frictions between tires 11 and the road 12. In FIG. 1A, a deceleration system 100, according to the present disclosure is also shown being deployed form a resting position 100A to a deployed position 100B. As will be described further below, the deceleration system 100 can be deployed in an automated fashion based on various inputs to the deceleration system 100, or manually by a driver of the vehicle.

Figure 1B:
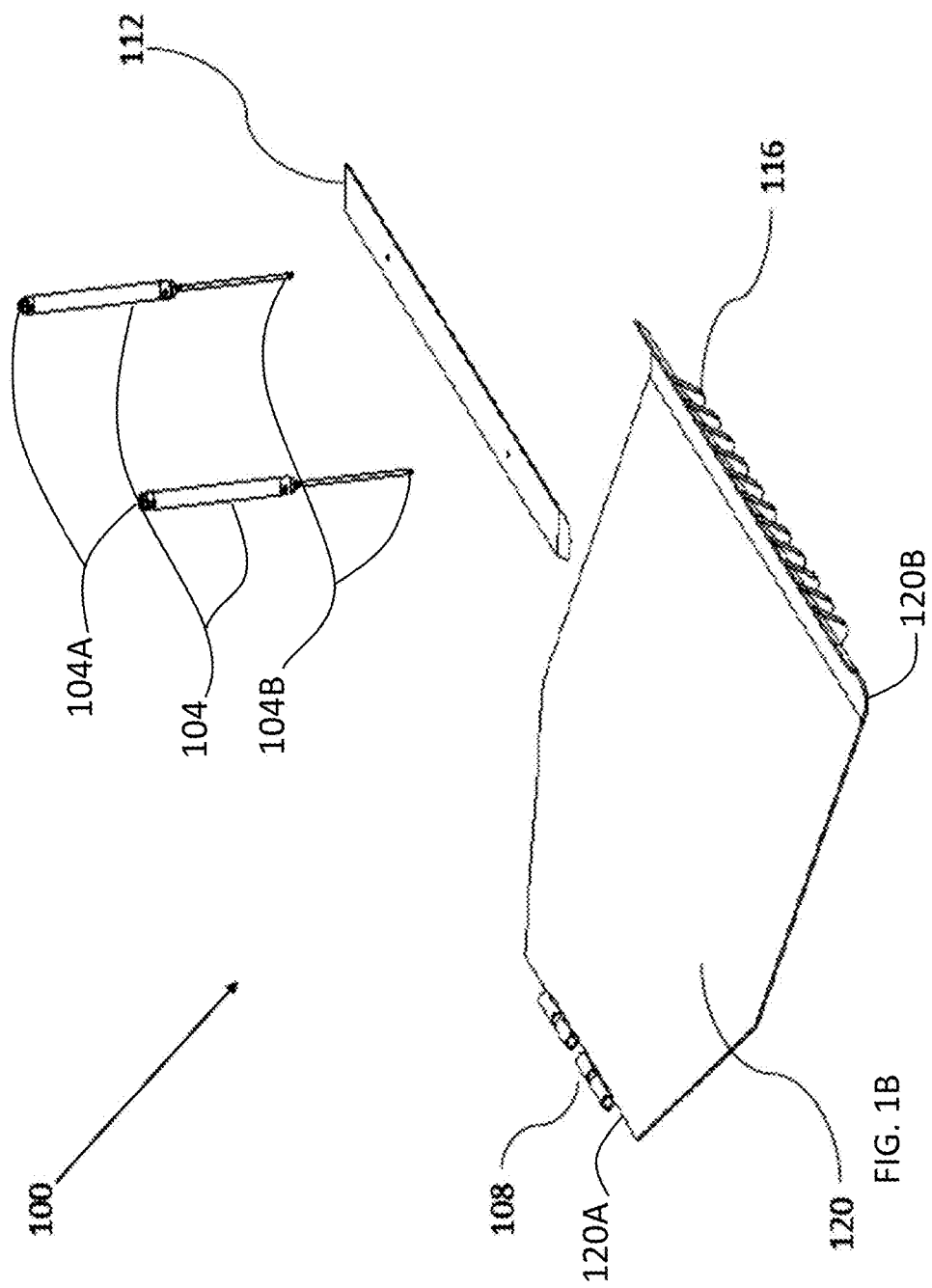
FIG. 1B is a schematic of the deceleration system of FIG. 1A.

FIG. 1B is an exploded view of one embodiment of the deceleration system 100, according to the present disclosure. The deceleration system 100, includes a friction applicator 120 having a mounting edge 120A and a deployment edge 120B, force applicators 104 having a rotating joint 104A and a fixed joint 104B, a vehicle coupler 108, a mounting interface 112, and a plurality of gripping protrusions 116. The vehicle coupler 108 is attached to the underside of a motor vehicle in a way that the deployment edge 120B is free to rotate away from the vehicle as shown in FIG. 1A, from the resting position 100A to the deployed position 100B. During normal operation of the vehicle, the friction applicator 120 provides an additional function of an underbody panel protecting the vehicle from debris and water. When the force applicators 104 are activated they extend and swing the friction applicator 120 from the resting position 100A to the deployed position 100B about the vehicle coupler 108 along an arc dictated by the length of the friction applicator 120 such that the mounting edge 120A is held up against the vehicle's undercarriage (not shown) by the vehicle coupler 108 and the deployment edge 120B is angled downward and can rotate from between about 10° to about 80° or until it is in contact with the ground. The force applicators 104 are mounted to the undercarriage of the vehicle (not shown) using the rotating joint 104A, e.g., a hinge or other rotatable joints known to a person having ordinary skill in the art, that allows the force applicators 104 to rotate with the friction applicator 120 as the friction applicator 120 rotates about the vehicle coupler 108. The vehicle coupler 108 includes a hinge-type arrangement or similar mechanism that constrains the friction applicator 120 to move about a single degree of freedom which allows rotation about the mounting edge 120A. When in contact with the ground, the gripping protrusions 116 dig into the driving surface providing a braking force by breaking up layers of ice as well as by creating friction between the friction applicator 120 and the driving surface.

The gripping protrusions 116 can be coated with a synthetic material to increase coarseness of their surfaces to thereby increase coefficient of friction. The gripping protrusions 116 can also be tapered between about 1° about 45° to improve the protrusions' ability to dig into the road surface. The friction applicator 120 is curved towards the mounting edge 120A so that in the situation where the vehicle starts sliding backwards, the friction applicator 120 does not get caught on the rough surface and break off. The mounting interface 112 couples the friction applicator 120 to the force applicators 104. The coupling between the mounting interface 112 and the friction applicator 120 is by one of welding, fasteners, integration as one unitary component, or other arrangements known to a person having ordinary skill in the art. The mounting interface 112 substantially extends the width of the friction applicator 120 to distribute the force supplied by the force applicators 104 substantially across the width of the friction applicator 120. Multiple force applicators 104 can be used to further increase the force applied to the ground as well as more evenly distribute the load across the width of the friction surface 120.

Figure 2:
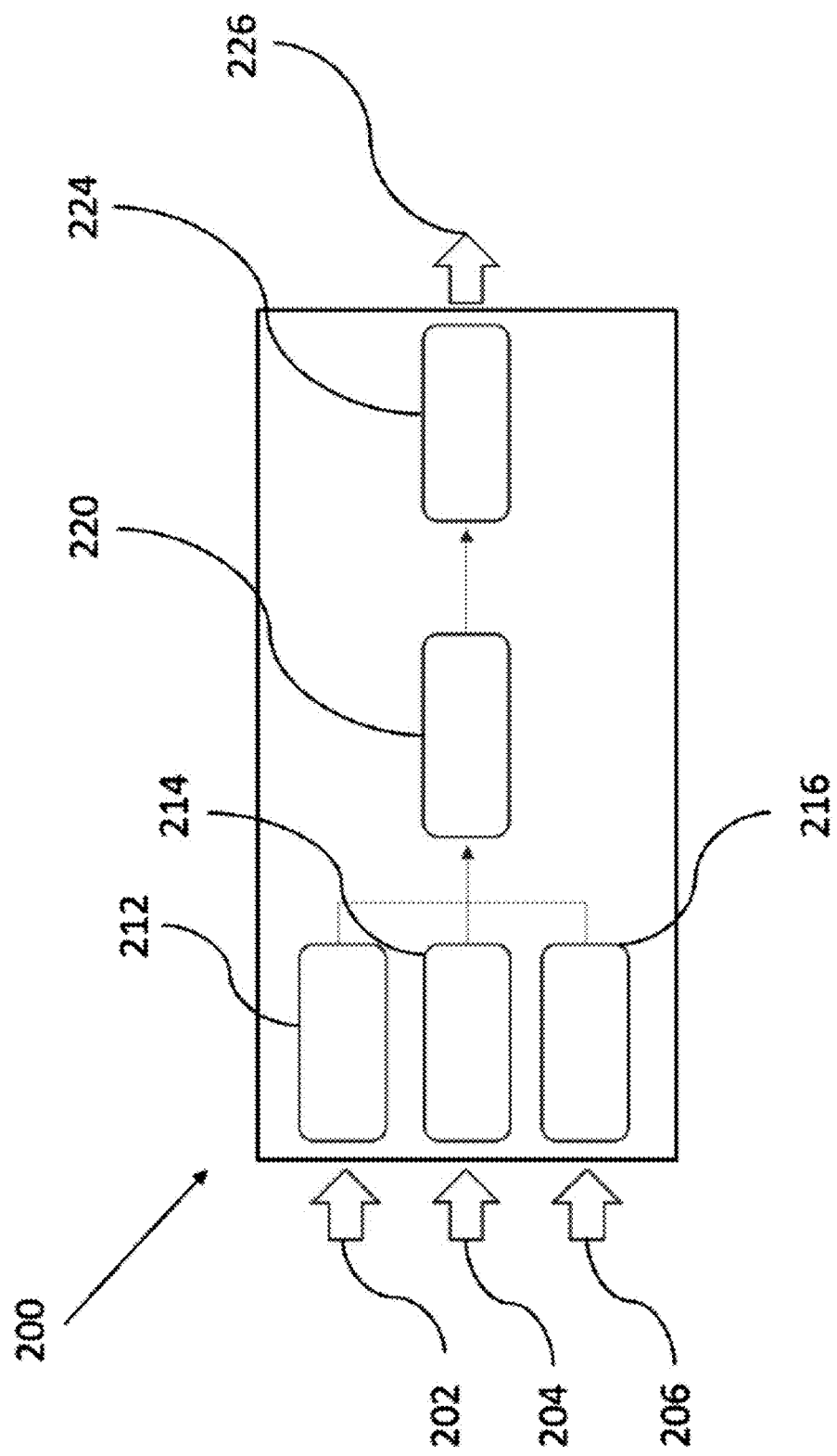
FIG. 2 is an operational block diagram for operations of the deceleration system of FIG. 1B.

FIG. 2 is a block diagram of a controller 200. A series of inputs including vehicle acceleration 202, vehicle speed measured at the wheel hub 204, and brake pedal activation 206, are received by a plurality of sensors 212, 214, and 216. For example, the sensor 214 can be a Hall Effect sensor or a variable reluctance sensor that are optically or magnetically coupled to the vehicle's wheel hub (not shown). Similarly, the brake pedal sensor 206 can be a mechanical switch. Similarly, the sensor 212 can be an accelerometer housed within the controller 200. The sensors 212, 214, and 216, which detect the input and relays the information to a processor 220. The processor 220 determines if necessary conditions are met. The necessary conditions are: brake is being applied, velocity of wheel hub rotation is under 15 mph by the vehicle speed sensor 214, and the acceleration sensor 212 is reading the vehicle as continuing to move forward at a greater rate than the vehicle speed sensor 214 indicates. The combination of these signals indicates that the driver is attempting to stop the vehicle but road conditions are preventing the vehicle from stopping with standard brake methods. If the necessary conditions are met, then the processor 220 relays a signal to the force applicators 224, coupled to the friction applicator 226, which rotates to make contact with the road to decelerate the vehicle through frictional forces.

Figure 3:
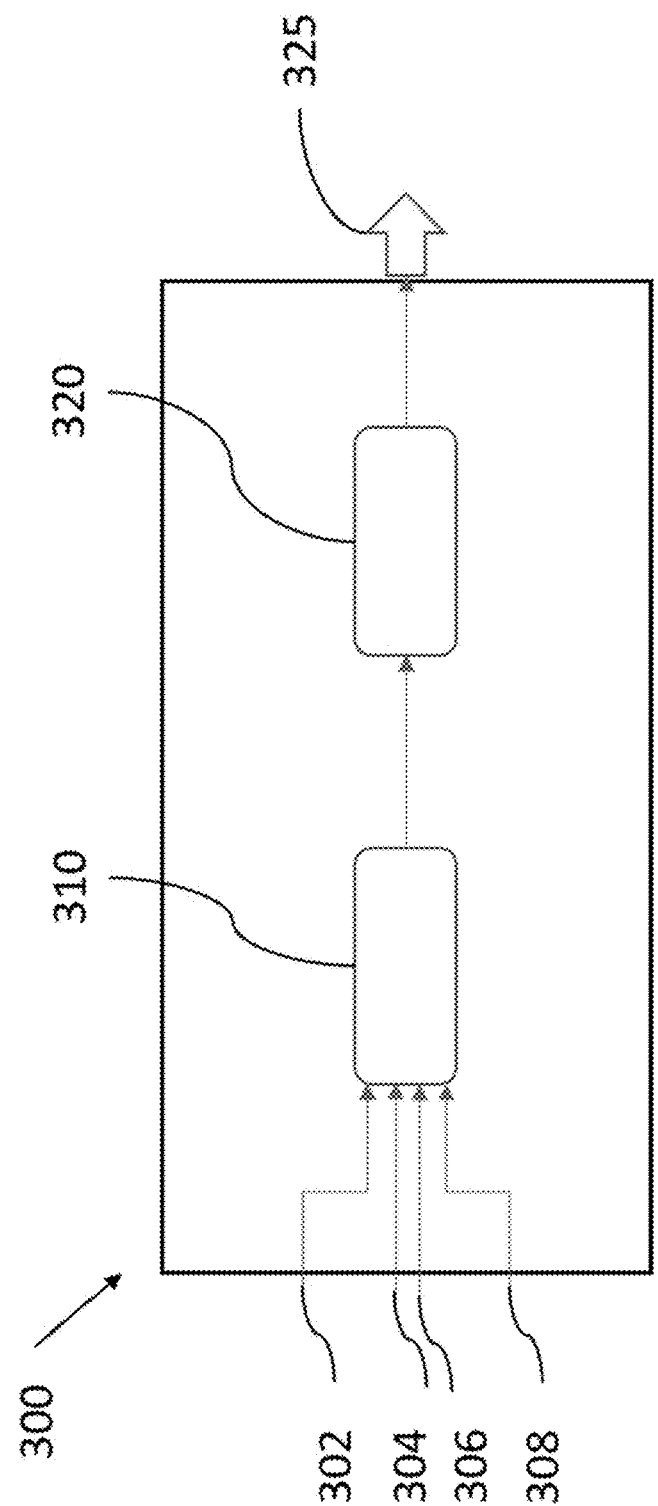
FIG. 3 is an operational block diagram for a second embodiment of a deceleration system, according to the present disclosure.

FIG. 3 is a block diagram of a controller 300 for the system. A series of inputs, temperature 302, speed 304, ABS signal 306, and distance sensor 308 are provided to the controller by the engine control unit (not shown) or directly from the sensors themselves (not shown). The processor 310 determines if necessary conditions are met. The necessary conditions are: temperature is below about 0 degrees Celsius, vehicle speed is below about 15 mph, and the ABS system is being applied. These conditions ensure that the vehicle deceleration system 100 is not activated under dangerous situations that could harm the vehicle, passengers, or the road surface. If the necessary conditions are met, then the processor 310 triggers an initial amount of force of about 75 lbf to about 125 lbf for each force applicator 104 to be applied by the gripping protrusions 116. This force provides a compression force over 5 Megapascals at the tip of each gripping protrusion 116, which is the compression strength of ice at freezing. This amount of force ensures that the road will not be damaged if the system is applied without ice due to the compression strength of the average road surface being about 20 Megapascals. The initial force is low such that the deceleration system 100 does not damage the road surface. The controller 300, monitors the speed 304 to determine the rate of deceleration that the initial amount of force is creating. If the rate of deceleration is not at an acceptable level to prevent the vehicle from colliding with any surrounding objects, the processor 310 increases the amount of force being applied to the gripping protrusions 116. The necessary rate of deceleration is continually monitored by measuring the distance between the vehicle and surrounding objects. This is essentially using the relative velocity between the vehicle and surrounding objects such that if the surrounding object is in motion, the deceleration system 100 can stop the vehicle at a less aggressive rate. The process of continually monitoring the input signals to evaluate the rate of deceleration constitutes a closed loop feedback system. This type of control is needed due to the number of variables in calculating the necessary force to stop the vehicle. Many factors, such as thickness of ice, temperature, and weight of vehicle will affect the amount of force required at any given time. The temperature will significantly affect the hardness of the ice, increasing the amount of force required to penetrate it for maximum stopping force.

In accordance with one embodiment of the present disclosure, a hydraulic system known to a person having ordinary skill in the art similar to the braking system in a motor vehicle can be employed to provide forces necessary by the force applicators as described above. These forces using the aforementioned hydraulic system can be selectively and incrementally applied based on the processor's continuing monitoring of the vehicle's deceleration. Therefor, the forces applied can begin based on a predetermined set of conditions (e.g., temperature) and increase as needed until the distance between an object in proximity to the vehicle and the vehicle stops changing or increase in magnitude. In one embodiment, the starting force provided by each force applicator can be between about 5% to about 10% of the gross vehicle weight and configured to increase to a range of about 10% to about 25% of the gross vehicle weight.

Those skilled in the art will recognize that numerous modifications can be made to the specific implementations described above. The implementations should not be limited to the particular limitations described. Other implementations may be possible.

The invention claimed is:
1. A vehicle deceleration system comprising;
a plurality of force applicators;
a friction applicator; and
a controller,
wherein the friction applicator is coupled to the underside of a motor vehicle in a resting position, wherein the plurality of force applicators are activated by the controller, wherein the force applicators rotate the friction applicator from the resting position into a deployed position where the friction applicator is in contact with a road surface, thereby translating forces from the plurality of force applicators to the road surface, the friction applicator further comprises:
- a mounting edge configured to be rotatably coupled to an undercarriage side of the vehicle, and a deployment edge,
- a plurality of gripping protrusions disposed at the deployment edge and configured to make contact with the road surface,
- a mounting interface to couple the friction applicator to the plurality of force applicators.

2. The vehicle deceleration system of claim 1, wherein each of the plurality of force applicators is configured to start between about 5% to about 10% of a predetermined weight and configured to increase to a range of about 10% to about 25% of the predetermined weight.

3. The vehicle deceleration system of claim 2, wherein the predetermined weight is the vehicle's gross vehicle weight.

4. The vehicle deceleration system of claim 3, the controller comprising:
- a plurality of sensors; and
- a processor, wherein the processor receives inputs from the plurality of sensors, wherein said plurality of sensors comprise a plurality of first sensors, at least one second sensor, and a third sensor, wherein the plurality of first sensors provide information corresponding to rotational speed of each wheel hub assembly, wherein the at least one second sensor provides information corresponding to the vehicle deceleration, wherein the third sensor provides information corresponding if brakes are being applied, wherein the processor monitors the plurality of first sensor, the at least one second sensor, and the third sensor; and wherein the processor activates the plurality of force applicators when a predetermined set of conditions have been met.

5. The vehicle deceleration system of claim 3, the controller comprising:
- a processor;

wherein the processor monitors a series of inputs including the ambient air temperature, vehicle speed, presence of antilock brake system, and the distance between the vehicle and nearest object from the vehicle control system, wherein the processor activates the plurality of force applicators when a predetermined set of conditions have been met.

\* \* \* \* \*